US010365817B2

(12) United States Patent
Cullin et al.

(10) Patent No.: US 10,365,817 B2
(45) Date of Patent: Jul. 30, 2019

(54) MOBILE COMMUNICATION TERMINAL PROVIDING ADAPTIVE SENSITIVITY OF A CLICK EVENT

(71) Applicant: DORO AB, Malmö (SE)

(72) Inventors: Peter Cullin, Staffanstorp (SE); Ola Lennartsson, Malmö (SE)

(73) Assignee: Doro AB, Malmö (SE)

( * ) Notice: Subject to any disclaimer, the term of this patent is extended or adjusted under 35 U.S.C. 154(b) by 0 days.

(21) Appl. No.: 15/542,021

(22) PCT Filed: Dec. 29, 2015

(86) PCT No.: PCT/EP2015/081350
§ 371 (c)(1),
(2) Date: Jul. 6, 2017

(87) PCT Pub. No.: WO2016/110431
PCT Pub. Date: Jul. 14, 2016

(65) Prior Publication Data
US 2017/0371514 A1    Dec. 28, 2017

(30) Foreign Application Priority Data
Jan. 7, 2015   (EP) .................................... 15150280

(51) Int. Cl.
G06F 3/0488        (2013.01)
G06F 3/0484        (2013.01)

(52) U.S. Cl.
CPC ........ *G06F 3/0488* (2013.01); *G06F 3/04842* (2013.01)

(58) Field of Classification Search
None
See application file for complete search history.

(56) References Cited

U.S. PATENT DOCUMENTS

2015/0058723 A1*  2/2015  Cieplinski ........... G06F 3/04855
                                                              715/702

FOREIGN PATENT DOCUMENTS

WO    WO 2013/169865    11/2013

OTHER PUBLICATIONS

International Search Report and Written Opinion for PCT/EP2015/081350 dated Feb. 5, 2016.

(Continued)

*Primary Examiner* — Brian M Butcher
(74) *Attorney, Agent, or Firm* — Merchant & Gould P.C.

(57) ABSTRACT

A mobile communication terminal has a controller and a touch display. The touch display is arranged to display at least a first graphical object and a second graphical object, receive a touch, and determine a touch position and a touch duration for the touch. The controller is configured to receive the touch position and the touch duration, determine a graphical object, among the first graphical object and the second graphical object, corresponding to the touch position, determine if the touch duration exceeds a reference time threshold, and if so, generate a click event for the corresponding graphical object. The first graphical object is associated with a first time threshold, and the second graphical object is associated with a second time threshold. The first time threshold is different from the second time threshold. The controller is further configured to retrieve the first time threshold if the corresponding graphical object is the first graphical object and use the first time threshold as the reference time threshold, and retrieve the second time threshold if the corresponding graphical object is the second graphical object and use the second time threshold as the reference time threshold. The first time threshold is either higher or lower than said second time threshold depending on one or more of the following: a size, shape or/and color (Continued)

of the corresponding graphical object, a distance from the corresponding graphical object to a neighboring graphical object, a relative location of the corresponding graphical object in a touch area of the touch display, and a level of the corresponding graphical object in a menu hierarchy.

11 Claims, 7 Drawing Sheets

(56) References Cited

OTHER PUBLICATIONS

International Preliminary Report on Patentability for PCT/EP2015/081350, dated Mar. 22, 2017.
European Search Report for European Patent Application No. 15150280.4, dated Jul. 14, 2015.

* cited by examiner

MOBILE COMMUNICATION TERMINAL PROVIDING ADAPTIVE SENSITIVITY OF A CLICK EVENT

This application is a National Stage Application of PCT/EP2015/081350, filed 29 Dec. 2015, which claims benefit of European Patent Application No. 15150280.4, filed 7 Jan. 2015, which applications are incorporated herein by reference. To the extent appropriate, a claim of priority is made to each of the above disclosed applications.

TECHNICAL FIELD

The present invention generally relates to the field of electronic equipment, and more particularly to a mobile communication terminal providing adaptive sensitivity of a click event.

BACKGROUND

Electronic equipment comes in many different brands, shapes and types. Examples include tablet computers, personal digital assistants (PDA:s), portable media players (e.g. MP3 players), palmtop computers, mobile terminals such as mobile telephone, digital cameras, game consoles, navigators, etc. A mobile communication terminal, or simply a mobile terminal, in the form of a smart phone with touch-sensitive display screen will be used as a non-limiting example of a portable electronic device in the following.

The present inventors have realized that users of mobile terminals are nowadays a very heterogeneous group in which there are considerable variations in terms of age, user experience, physiological motor ability, visual capacity, and general user preference. Existing touch sensor devices fail to fully appreciate this.

In prior art solutions it is possible to configure different speeds of the mouse click button in order to distinguish between a double click and a single click. It is also known to distinguish between a long and a short press on the touch screen by measuring the applied force. In addition, it is possible to configure a lower or higher sensibility level for all virtual or mechanical keys of the mobile terminal. However, none of the above mentioned solutions are sufficiently user-friendly.

There is thus a need for a mobile terminal that can be used and appreciated by a heterogeneous group of users, while still being easy to configure and inexpensive.

WO 2013/169865 discloses, in FIGS. 14A-16 and the associated description, an electronic device having a touch-sensitive user interface. User interface controls (such as buttons) which control important functions require a more intense or a longer actuation (higher time and/or intensity actuation threshold) than other controls which control less important functions. To provide an additional layer of safeguard against accidental or inadvertent actuation of a control which controls an important function, visual feedback is given to the user based on the intensity or duration of the user's contact with the control. In a preferred design, the visual feedback is given by changing the appearance of the control; this may for instance involve changing the fill color of the control (FIG. 14B), or by presenting a progress bar inside the control (FIGS. 14E, 14F and 14 G).

A drawback with this prior art approach can be seen in that it requires manipulation of the graphical design of the user interface to accommodate for the visual feedback capability. In other words, the user interface will have to be modified and hence look different from a standard-looking user interface, and this may in itself be confusing particularly to inexperienced users or visually impaired users. Also, the approach does not account for the fact that inexperienced users, visually impaired users or users with reduced physiological motor ability may have difficulties in accurately operating different controls in a user interface depending on the respective appearances of the controls.

SUMMARY

It is accordingly an object of the invention to eliminate or alleviate at least some of the problems referred to above, by providing a mobile communication terminal with adjustable click times for different graphical objects (i.e. controls) in the user interface.

One aspect of the present invention is a mobile communication terminal comprising a controller and a touch display, wherein said touch display is arranged to display at least a first graphical object and a second graphical object, receive a touch, and determine a touch position and a touch duration for said touch. The controller is configured to receive said touch position and said touch duration, determine a graphical object, among said first graphical object and said second graphical object, corresponding to said touch position, determine if said touch duration exceeds a reference time threshold, and if so, generate a click event for said corresponding graphical object. The first graphical object is associated with a first time threshold and the second graphical object is associated with a second time threshold, said first time threshold being different from said second time threshold. The controller is further configured to retrieve said first time threshold if said corresponding graphical object is said first graphical object and use said first time threshold as said reference threshold, and retrieve said second time threshold if said corresponding graphical object is said second graphical object and use said second time threshold as said reference threshold. The first time threshold is either higher or lower than the second time threshold depending on one or more of the following: a size, shape or/and color of the corresponding graphical object, a distance from the corresponding graphical object to a neighboring graphical object, a relative location of the corresponding graphical object in a touch area of the touch display, and a level of the corresponding graphical object in a menu hierarchy.

Hence, different graphical objects in the user interface of the mobile communication terminal may be associated with different time thresholds for generating a click event, depending on a difference in appearance between the graphical objects. By choosing different appropriate time thresholds for differently appearing graphical objects (such as differently shaped, sized, colored, positioned, etc, graphical objects) in the user interface, usage by inexperienced users, visually impaired users or users with reduced physiological motor ability may be facilitated. Thanks to the difference in time thresholds, such users may more accurately operate different controls even though their appearances are different in terms of shape, size, color, relative location, etc.

Notably, the visual design of the user interface will not have to be modified, unlike in the prior art approach referred to above.

Another aspect of the invention is a method of providing adaptive sensitivity of a click event for a mobile communication terminal having a touch display, according to the attached independent method claim, Other aspects of the invention and its embodiments are defined by the appended patent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Objects, features and advantages of embodiments of the invention will appear from the following detailed description, reference being made to the accompanying drawings, in which.

DETAILED DESCRIPTION

Figure 1:
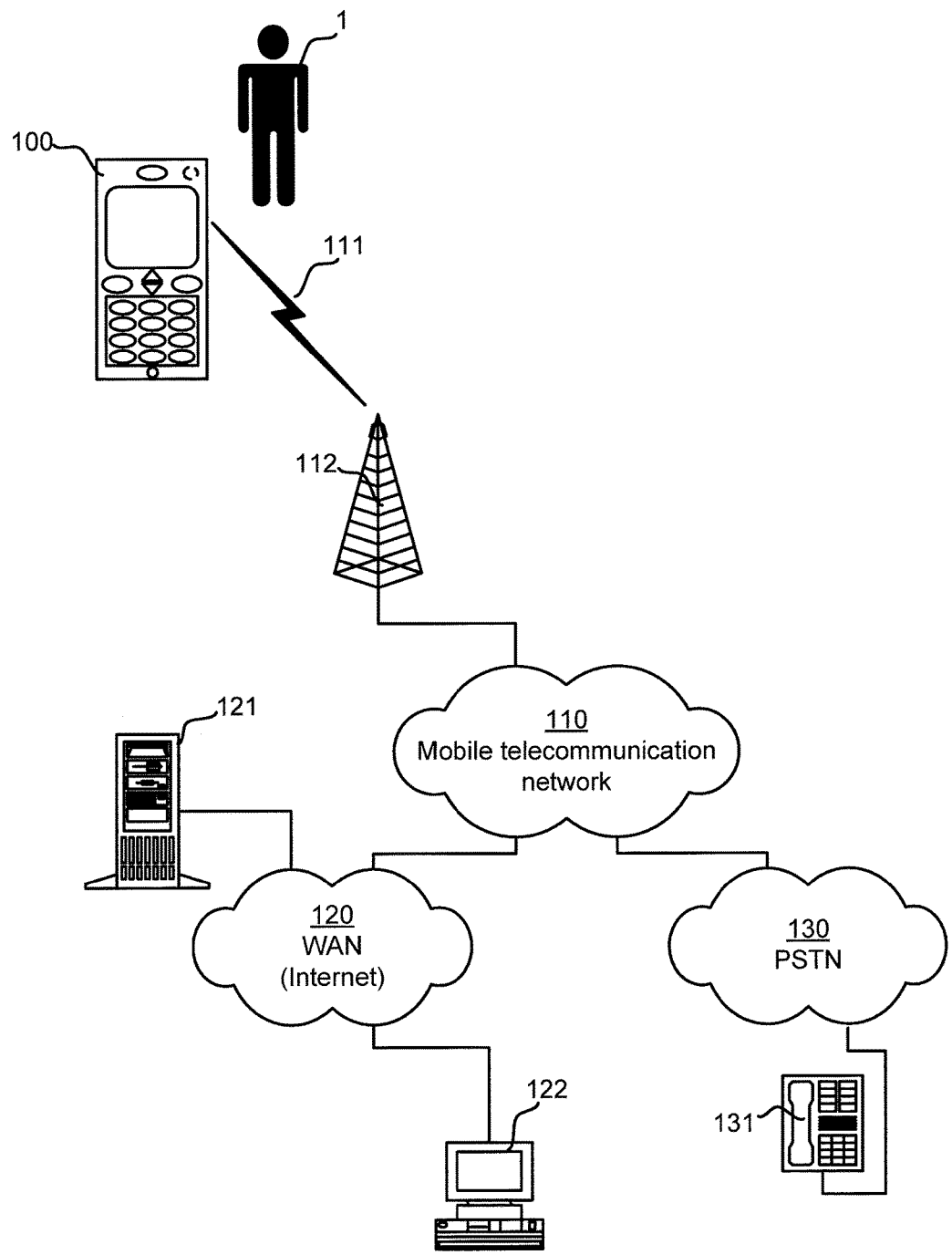
FIG. 1 is a schematic illustration of a non-limiting example of a telecommunication system in which embodiments of the present invention may be exercised.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Before turning to a detailed description of the disclosed embodiments, an exemplifying environment in which they may be exercised will now be briefly described with reference to FIG. 1.

In FIG. 1, a portable electronic device in the form of a mobile communication terminal 100, or simply a mobile terminal, is part of a cellular telecommunications system. A user 1 of the mobile terminal 100 may use different telecommunications services, such as voice calls, Internet browsing, video calls, data calls, facsimile transmissions, still image transmissions, video transmissions, electronic messaging, and e-commerce. The invention is however not limited to any particular set of services.

The mobile terminal 100 may connect to a mobile telecommunication network 110 over a radio link 111 and a base station 112. The mobile terminal 100 and the mobile telecommunication network 110 may comply with any commercially available mobile telecommunication standard, for instance (without limitation) GSM, UMTS, LTE, D-AMPS, CDMA2000, FOMA and TD-SCDMA. Embodiments of the mobile terminal 100 will be described in closer detail with reference to the following drawings.

A public switched telephone network (PSTN) 130 is connected to the mobile telecommunication network 110. Telephone terminals of PSTN subscribers may connect to the PSTN 130. In FIG. 1, a stationary telephone 131 is indicated as a mere example of this.

The mobile telecommunication network 110 is operatively associated with a wide area data network 120, which may be the Internet or a part thereof. Server computers 121 and client computers 122 may be connected to the wide area data network 120 to allow communication with the mobile terminal 100.

Figure 2:
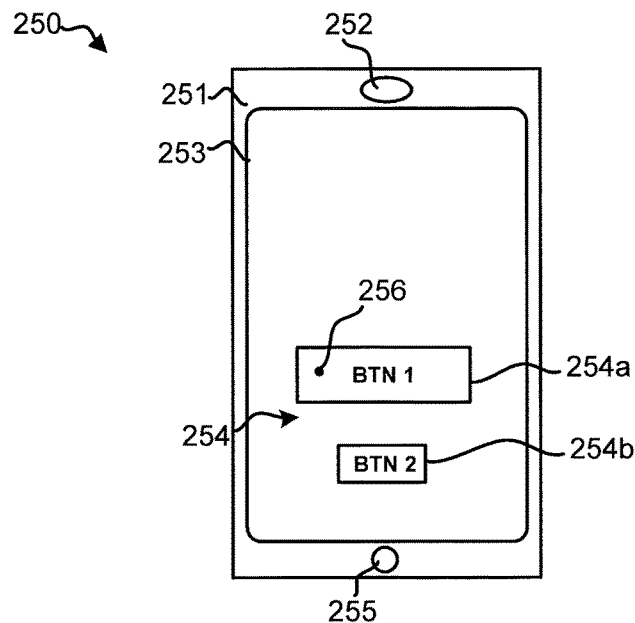
FIG. 2 is a schematic front view of a portable electronic device according to an embodiment, in the form of a mobile communication terminal of smart phone-type, having a touch-sensitive display screen with two graphical objects presentable thereon.

An embodiment 250 of the mobile terminal 100 is illustrated in more detail in FIG. 2. The mobile terminal 200 is of smart phone-type and has a touch-sensitive display screen 253, or simply a touch display, provided at a front side 251 of the terminal housing. The touch display 253 is arranged to display graphical objects 254a, 254b such as buttons (a.k.a virtual keys), menu items, links etc., as will be described more in detail in accordance with FIG. 3. In the embodiment shown in FIG. 2, the touch display 253 displays a first graphical object 254a and a second graphical object 254b. When a user 1 touches a graphical object 254a, 254b in the touch area of the touch display 253, a touch position 256 is determined.

The front side 251 has a loudspeaker 252 and a microphone 255. Certain special keys, even mechanical ones, may be provided in addition to the touch-sensitive display screen 253, even though not shown in FIG. 2. Also, other well-known components, such as camera, power switch, battery, charger interface, accessory interface, volume controls and external antenna, may be provided but are not indicated in FIG. 2.

Other kinds of mobile terminals are also fully conceivable embodiments of a portable electronic device according to the present invention. Mobile terminals having two main housing parts hinged together to form a clamshell phone or a swivel phone are some examples that are worth mentioning.

Figure 3:
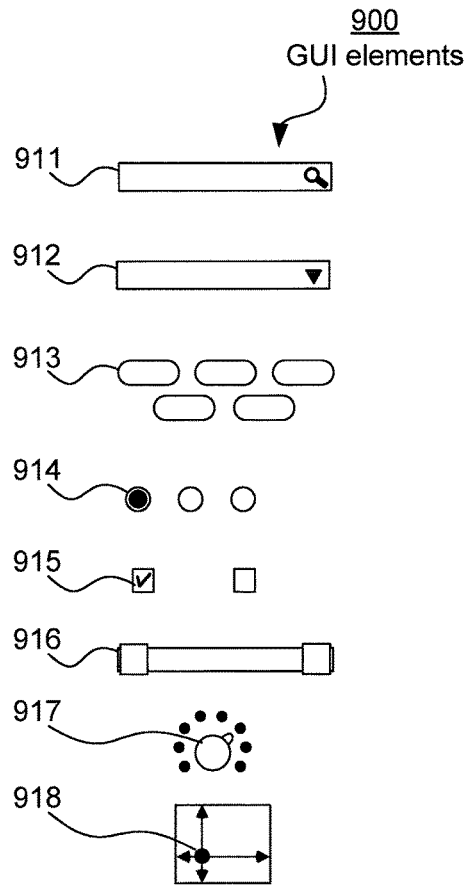
FIG. 3 illustrates different examples of graphical user interface elements for a mobile communication terminal.

FIG. 3 illustrates a set of typical but non-limiting examples of GUI elements 900 which may be used as graphical objects 254a, 254b. The GUI elements 900 may include, in any given number and combination, a free-text search field 911, a pull-down menu 912, select (on-off) buttons 913, radio buttons 914, check boxes 915, a slider control 916, a knob wheel control 917, and a two-dimensional control 918. The slider control 916 and the knob wheel control 917 are adjustable controls for setting one or more values of a parameter in a range of possible values by positioning one or more control handles accordingly. The two-dimensional control 918 allows for positioning of a control handle along orthogonal axes to set two such values concurrently.

The internal software and hardware structure of a mobile terminal, for instance the mobile terminal 250 according to the embodiment shown in FIG. 2, will now be described with reference to FIG. 4. Software components are indicated within a dash-dotted frame, whereas hardware components are outside of this frame. The mobile terminal has a controller 300 being responsible for general device operations. Any commercially available central processing unit (CPU) or digital signal processor (DSP), or other programmable electronic logic device such as an application-specific integrated circuit (ASIC) or field-programmable gate array (FPGA), may be used to implement the controller 300. The controller 300 has associated memory 302 which includes a work memory (RAM) 304 and a non-volatile storage memory 305, for instance in the form of EEPROM, flash memory (e.g. memory card), hard disk, or any combination thereof. The controller 300 uses the memory 302 for different purposes, for instance for storing file objects as well as data and program instructions for the software in the mobile terminal.

The software includes an operating system core 320 on a lower level, application programs 340-346 on an upper level for interaction with the user 1, and drivers and handlers for the hardware and the application programs on an intermediate level. The intermediate level includes a GUI handler 334 which forms a user interface towards the user 1 by controlling display 336 (253), keypad 337 (254) as well as other I/O devices which may be included in the mobile terminal (e.g. microphone, loudspeaker, vibrator, ringtone generator, LED status indicator, audio volume controls, etc). When the display 336 comprises a touch-sensitive display screen 338, like display screen 253 in FIG. 2, the GUI handler 334 controls this display screen 338 to act both as an output device and an input device.

An application handler 332 controls the application programs 340-346, which may include a messaging (e.g. SMS, MMS or email) application 340, a contacts application 342, a browser (e.g. www, wap) application 344, as well as various other applications 346, such as applications for voice calls, video calls, calendar, file handling, a control panel or settings application, a camera application, one or more video games, a word processing application, a spreadsheet application, a drawing application, a slideshow presentation application, etc.

Figure 4:
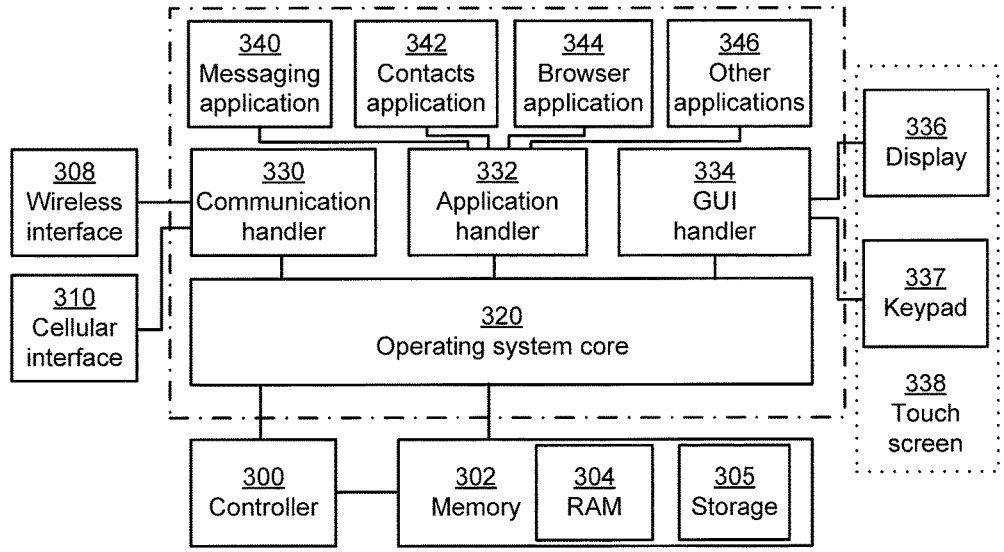
FIG. 4 is a schematic block diagram illustrating the basic internal hardware and software layout of a mobile communication terminal according to one embodiment.

The software also includes various modules, protocol stacks, drivers, etc., which are commonly designated as communication handler 330 and which provide communication support for a cellular interface 310 and, optionally, a wireless interface for Bluetooth, WLAN, NFC or IrDA (commonly designated as 308 in FIG. 4). The cellular interface 310 comprises an internal or external antenna as well as appropriate radio circuitry for establishing and maintaining a wireless link to a base station (e.g. the link 111 and base station 112 in FIG. 1). The radio circuitry comprises a radio transmitter and receiver (transceiver; TX/RX), formed for instance by band pass filters, amplifiers, mixers, local oscillators, low pass filters, AD/DA converters, etc.

Figure 5:
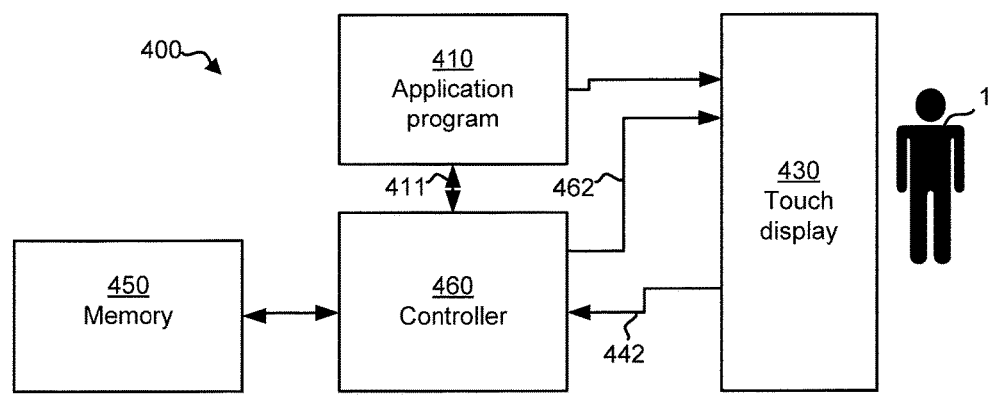
FIG. 5 is a schematic block diagram illustrating some main elements of a mobile communication terminal enabled for user-configurable setting of the time threshold of a click event in accordance with an embodiment.

With reference to FIG. 5, an arrangement 400 of some main elements of a mobile communication terminal, which is enabled for user-configurable setting of a user interface feature, such as adjusting the sensitivity of a click event for graphical objects based on difference in appearance, in accordance with embodiments of the invention, will now be described. The description is made with exemplifying reference to the embodiment of FIG. 2, where the electronic device is implemented as a smart phone terminal 250; however, the skilled person readily realizes that the arrangement 400 could also be applied to other embodiments. The skilled person would also realize that the arrangement can also be applied to other user interface features than the time threshold for touch duration in the example of FIG. 5.

As seen in FIG. 5, the arrangement 400 comprises a controller 460 which can be invoked whenever an application program 410 (such as one of the application programs 340-346 of FIG. 4) requires input from the user 1. The controller 460 may be implemented in software and is advantageously a part of the GUI handler 334 of FIG. 4. The controller 460 is operatively connected to a touch sensitive display 430/253 to detect a touch on the touch sensitive display.

Figure 6:
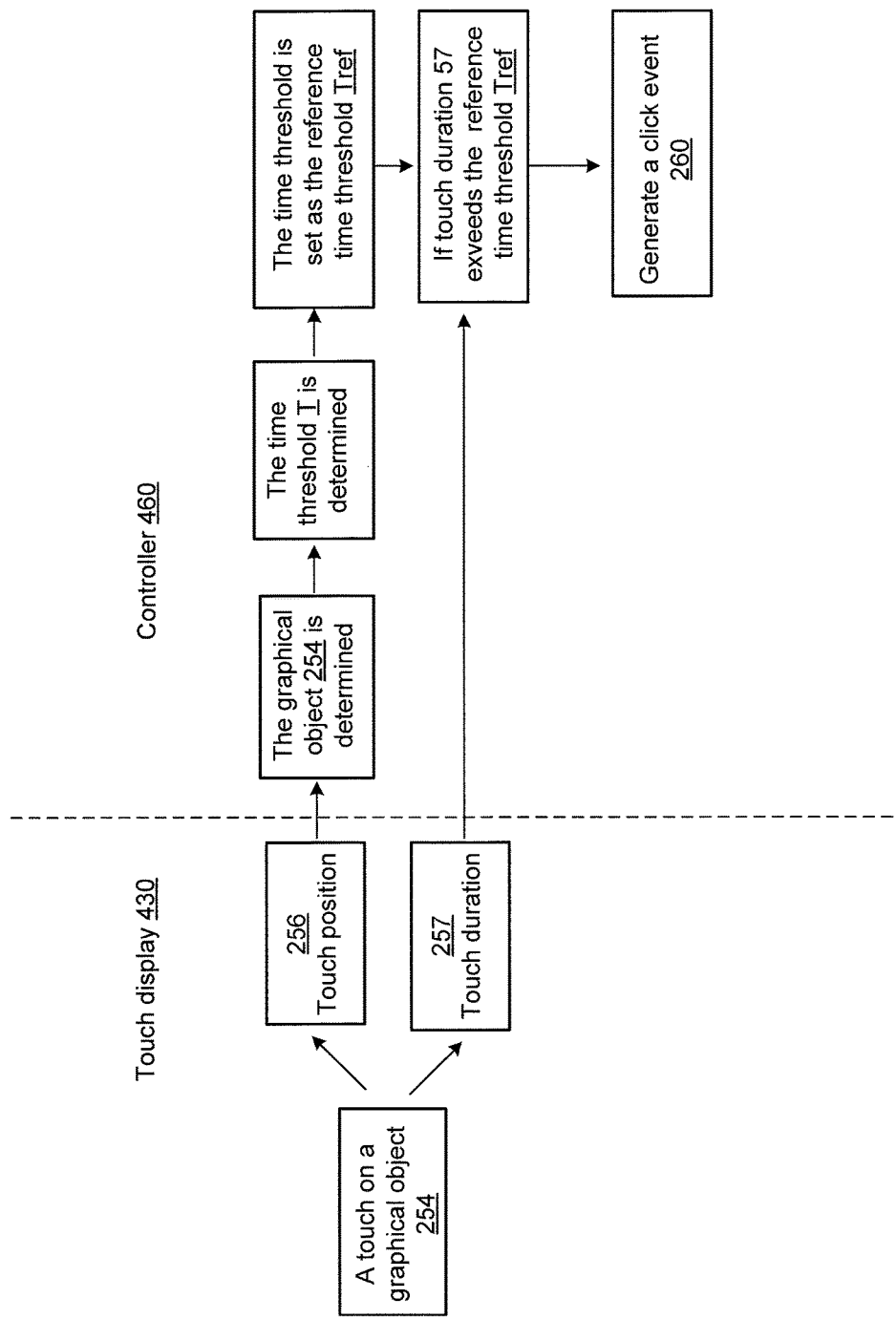
FIG. 6 is a schematic view of the general concept of adjusting the time threshold of a click event according to an embodiment.

Reference is now made to FIG. 6. In one embodiment the touch display 430 displays at least two graphical objects 254a, 254b. When the user 1 touches one of the graphical objects 254a, 254b on the touch display 430 the touch is registered, and a touch position 256 and a touch duration 257 for the touch is determined. The touch position 256 comprises the coordinates needed to determine the position of the touch in the touch area of the touch display. The touch duration 257 is the time that the user is touching the touch display, e.g. actuating the graphical object. The controller 460 is configured to receive the touch position 256 and the touch duration 257 from the touch display 430. The controller 460 then determines a graphical object 254a, 254b corresponding to that touch position 256. Once the graphical object 254a, 254b is determined, the controller 460 receives a time threshold $T_1$, $T_2$ for that graphical object 254a, 254b. The received time threshold $T_1$, $T_2$ is set to a reference time threshold $T_{ref}$. The time threshold $T_1$, $T_2$ is represented by a variable T, a value of which may be configured by the user 1 as will be apparent from the following description. To this end, control means 460 for user-configurable setting of the threshold $T_1$, $T_2$ is provided. Furthermore, the controller 460 is configured to determine if the touch duration 257 exceeds the reference time threshold $T_{ref}$. If the touch duration 257 exceeds the reference time threshold $T_{ref}$, the controller is configured to generate a click event 260 for the corresponding graphical object 254a, 254b. If the touch duration 257 doesn't exceed the reference time threshold $T_{ref}$, no click is registered.

Each graphical object 254a, 254b is associated with a time threshold $T_1$, $T_2$. Different graphical objects 254a, 254b may have different time thresholds $T_1$, $T_2$, thus reducing input errors by the user. In one embodiment, the time threshold $T_1$, $T_2$ depends on one or several of: the type (e.g. a main menu item or a sub-menu item in a menu hierarchy), the size (e.g. large objects or smaller objects), the color (e.g. brighter or darker colors), the shape (e.g. irregular or regular shapes), the distance to neighboring objects (e.g. long or short distance), the relative location of the graphical objects 254a, 254b on the screen (e.g. to the right or left), or it may depend on behavioral patterns of the user. The touch time threshold $T_1$, $T_2$ for the graphical object 254a, 254b can be long or short, e.g. reduce or increase the sensitivity of the touch sensor, depending on the configuration of the mobile communication terminal.

In one embodiment, the controller 460 retrieves the time threshold $T_1$, $T_2$ from a list in the memory (e.g. 302 in FIGS. 4 and 450 in FIG. 5).

In another embodiment, the controller 460 retrieves the time threshold $T_1$, $T_2$ from the graphical object 254*a*, 254*b* itself, for instance by receiving a "time threshold" property of the graphical object 254*a*, 254*b*, or of a data object defined in an object-oriented programming language to represent the graphical object 254*a*, 254*b*.

In one embodiment, the first graphical object 254*a* is associated with a first time threshold $T_1$ and the second graphical object 254*b* is associated with a second time threshold $T_2$. The first time threshold $T_1$ is different from the second time threshold $T_2$.

Figure 7:
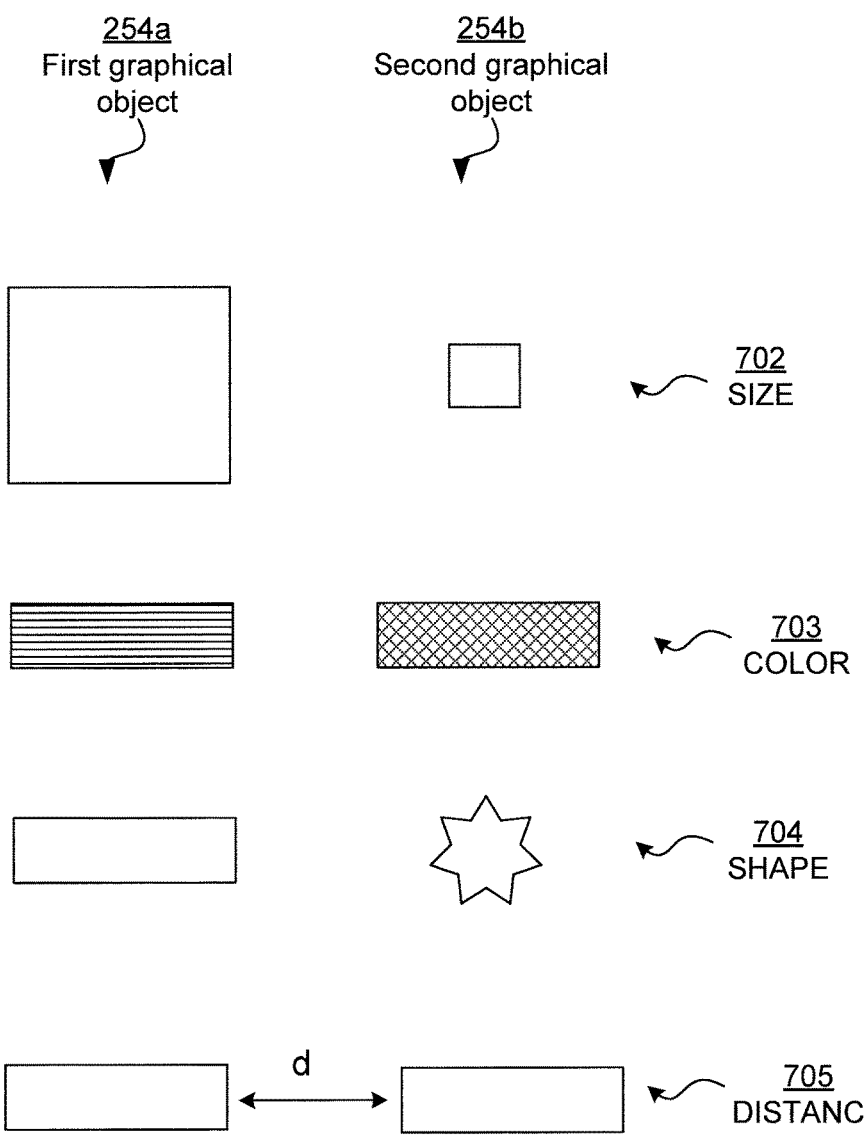
FIG. 7 illustrates different examples of graphical objects for a mobile communication terminal according to one embodiment.

FIG. 7 illustrates a set of non-limiting examples of combinations of graphical objects which may correspond to different time thresholds $T_1$, $T_2$. The graphical objects may have, in any given number and combination, different sizes 702, colors 703, shapes 704 or distances 705.

Reference is now made to a first example according to FIG. 7, which pertains to difference in sizes 702. Since it is harder to correctly touch a smaller graphical object than a bigger one, it is beneficial to have different time thresholds $T_1$, $T_2$ for different sizes of the graphical objects. In this first example, the first graphical object 254*a*, which is larger than the second graphical object 254*b*, is associated with a first time threshold $T_1$, whereas the smaller graphical object 254*b* is associated with a second time threshold $T_2$. Due to the possible difficulties to correctly touch the smaller object, the second time threshold $T_2$ is greater than the first time threshold $T_1$. Hence, the user has to touch the smaller object for a longer duration 257, compared to the bigger objects, in order to generate a click event 260.

In another example pertaining to FIG. 7, a difference in color 703 of the graphical objects 254*a*, 254*b* determines if the first time threshold $T_1$ or the second time threshold $T_2$ is associated with the object. For people suffering from color blindness or impaired vision, some colors are more difficult to distinguish than others. The most common problem for persons suffering from a color vision deficiency is the distinction between red and green. Thus, it would be beneficial to provide a higher sensitivity limit for graphical objects that are represented by a red or green color compared to graphical objects of other colors. Thus, in this example the first graphical object 254*a* is a red or green object associated with a first time threshold $T_1$, whereas the second graphical object 254*b* is an object of a different color (e.g. blue) associated with a second time threshold $T_2$. Hence, here it would be beneficial to have a first time threshold $T_1$ that is greater than the second time threshold $T_2$, so that it would require a longer touch in order to register a click event when touching a graphical object 254*a* with a red or green color.

In yet another example pertaining to FIG. 7, the shape of the graphical objects 254*a*, 254*b* determines if the first time threshold $T_1$ or the second time threshold $T_2$ is associated with the object. It is generally harder to correctly touch a graphical object having an irregular shape than to correctly touch a graphical object having a regular shape (e.g. a circle or a square). In this example, a first graphical object 254*a* is an object having a shape that is easy to touch correctly and is associated with a first time threshold $T_1$. A second graphical object 254*b* is here an object having a shape that is hard to touch correctly, which is associated with a second time threshold $T_2$. To avoid mistakes by the user, the second time threshold $T_2$ is greater than the first time threshold $T_1$. Hence, it requires a longer touch in order to register a click event when touching a graphical object 254*b* having an irregular shape.

Reference is now made to a fourth example according to FIG. 7, pertaining to a distance 705 from a graphical object 254*a* to a neighboring graphical object 254*b*. Graphical objects that are very close to one another require a more precise touch in order to gain an accurate click. Hence, longer touch duration for these objects would be beneficial in order to assure that the user actually was aiming for that specific graphical object. In this example, if the distance d between two graphical objects is larger than a predetermined value, i.e. the graphical objects are far away from each other, the graphical objects are associated with a first time threshold $T_1$. If the distance d between two graphical objects is smaller than the predetermine value, i.e. the graphical objects are close to each other, the graphical objects are associated with a second time threshold $T_2$. Here, the second time threshold $T_2$ is greater than the first time threshold $T_1$.

In one embodiment (not shown), the relation between the first time threshold $T_1$ and the second time threshold $T_2$ depends on the relative location of the graphical objects 254*a*, 254*b* displayed on the touch display 253. The fact that a user is either left-handed or right-handed may be reflected when using a touch display. A left-handed user may find it easier to correctly touch graphical objects located on the left side of the touch area of the touch screen than graphical objects located on the right side. In this example, a graphical object 254*a* located on the left side associated with a second time threshold $T_2$, whereas an object 254*b* located on the right side is associated with a first time threshold $T_1$. Here, the first time threshold $T_1$ is greater than the second time threshold $T_2$ if the user is left-handed and the first time threshold $T_1$ is less than the second time threshold $T_2$ if the user is right-handed.

Figure 8:
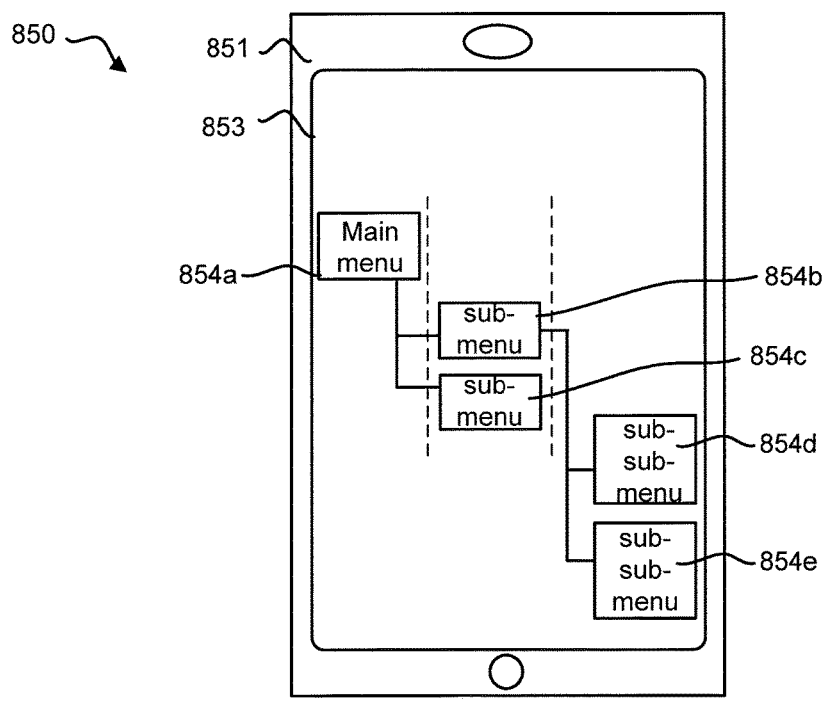
FIG. 8 is a schematic view of a mobile communication terminal of smart phone-type according to one embodiment, with graphical objects representing menu items at different levels of a menu hierarchy.

With reference to FIG. 8 an exemplary view of an embodiment of a touch display showing graphical objects 854*a-e* representing menu items in a menu hierarchy is shown. In this example, the menu hierarchy consists of three levels: the main menu 854*a*, the sub-menu 854*b*, 854*c* and the sub-sub-menu 854*d*, 854*e*. Each level is associated with a time threshold $T_1$, $T_2$, $T_3$. The main menu 854*a* is associated with a first time threshold $T_1$, the sub-menu 854*b*, 854*c* is associated with a second time threshold $T_2$, and the sub-sub-menu 854*d*, 854*e* is associated with a third time threshold $T_3$. The first time threshold $T_1$, the second time threshold $T_2$ and the third time threshold $T_3$ are all different to each other. In order to assure that the menu item in question was meant to be opened by the user, it is advantageous to have a longer time threshold $T_1$, $T_2$, $T_3$ for menu items of the main menu than for menu items of its sub-menus. Hence, in this embodiment the first time threshold $T_1$ is larger than both the second time threshold $T_2$ and the third time threshold $T_3$. When using a menu hierarchy as shown in FIG. 8, it is beneficial to distinguish between a scroll in a menu and a touch. Hence, if the second time threshold $T_2$ and the third time threshold $T_3$ are greater than a scroll time threshold (not shown) such as distinction is made.

More generally, as is clear also from the example described below with reference to FIG. 9, a first time threshold $T_1$ may be either higher or lower than a second time threshold $T_2$ depending on a level of a corresponding graphical object 854*a*, 854*b/c*, 854*d/e* (i.e. menu item) in a menu hierarchy.

Figure 9:
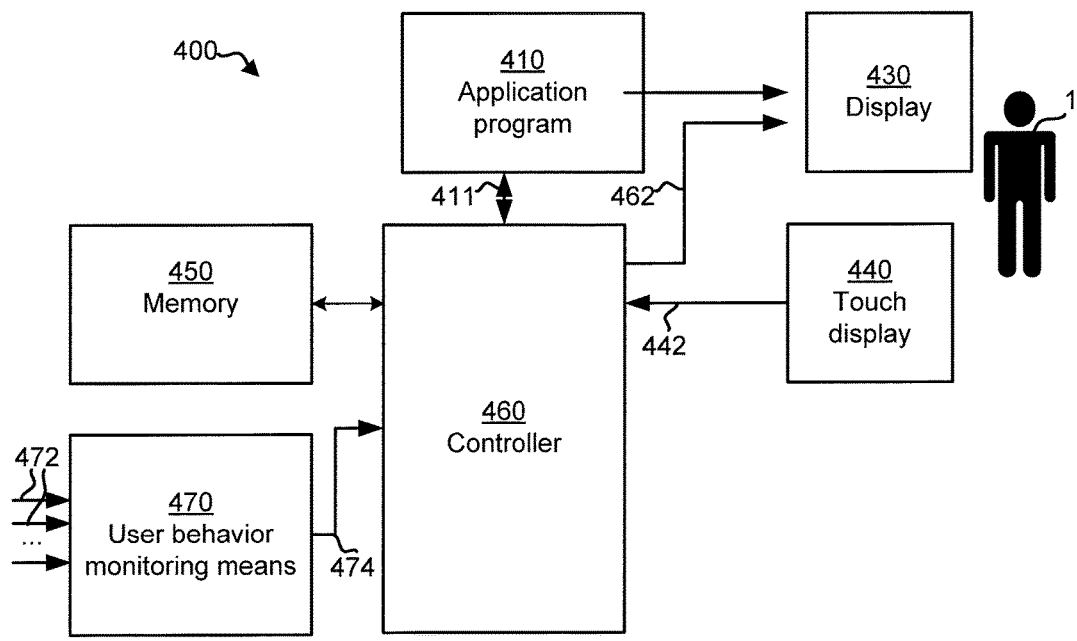
FIG. 9 is a schematic block diagram illustrating some main elements of a mobile communication terminal enabled for user-configurable setting of the time threshold of a click event in accordance with an embodiment.

In an embodiment according to FIG. 9, a user behavior monitoring means 470 is provided to further enhance the user configurability of the time threshold $T_1$, $T_2$ of a click event. The user behavior monitoring means 470 is configured to watch for a predefined user behavior pattern and, upon detection of this user behavior pattern, alert the control means 460 of this fact (see 474 in FIG. 9). In order to watch for the predefined user behavior pattern, the user behavior monitoring means 470 may use input signals 472 from various components of the mobile terminal 250. In one embodiment, the predefined user behavior pattern involves when a user has been found to use the undo command frequently. A high frequency of the undo command may indicate that the user is either inexperienced or that the user is visually impaired. The user should therefore benefit from being offered an adjusted user interface feature, such as a longer time threshold $T_1$, $T_2$ for high priority functions, a longer time threshold $T_1$, $T_2$ for smaller graphical objects or/and longer time threshold $T_1$, $T_2$ for different levels of a menu hierarchy.

Thus, the user behavior monitoring means 470 may conclude that the predefined user behavior pattern has been detected and alert the control means 460 accordingly, such that it will offer the user 1 a longer time threshold $T_1$, $T_2$ for high priority functions, a longer time threshold $T_1$, $T_2$ for smaller graphical objects or/and longer time threshold $T_1$, $T_2$ for different levels of a menu hierarchy. The predefined user behavior pattern may contain qualifiers or lower limits as to the frequency or duration of use of the service in question, or be confined to only certain specific services.

In one embodiment, the control means 460 is configured to offer on the display 430 a plurality of available setting values of the user interface feature, such as the time threshold $T_1$, $T_2$ (see 462 in FIG. 5). The default value may be one of these available setting values. For instance, the available setting values of the time threshold $T_1$, $T_2$ may be 50 ms, 100 ms and 150 ms, where 100 ms is the default value. Both the number of available setting values and their respective values can of course vary considerably depending on implementation. The user 1 may thus select one of these offered values by touching a GUI element representing the settings on the touch sensitive display, or another I/O device. The control means 460 will then accept the selected setting value, and set the user interface feature, in this example being the time threshold $T_1$, $T_2$ to the selected setting value.

In one embodiment, the control means 460 is further configured to store the selected setting value in the memory area of the non-volatile memory 450. Thus, the next time the mobile terminal is powered on or subjected to a system reset, the stored selected setting value will be read from the non-volatile memory 450, and the variables $T_1$, $T_2$ for the time threshold will be set, to the read selected setting value rather than the default value.

In one embodiment the control means 460 is configured to display a prompt on the display, after a time period has passed since a threshold time was adjusted, prompting for acceptance of the adjusted threshold time. This provides a user with an opportunity to accept or reject an adjusted setting. The control means 460 is configured to receive an acceptance from the user and determine whether the acceptance is positive or negative (a rejection of the adjusted setting). Should the acceptance be negative, the control means 460 is configured to reset the time threshold to the setting it had before.

In one such embodiment the control means 460 is configured to display a notification on the display informing the user that the threshold time has been adjusted as the user interface feature is adjusted.

In one embodiment the control means 460 is configured to display a prompt on the display prompting a user whether the adjusted threshold time should be further adjusted. In one such embodiment the prompt comprises a list of selectable values. In one alternative such embodiment the prompt comprises an indication whether the threshold $T_1$, $T_2$ time should be further increased or decreased in order to distinguish between high and low priority functions associated with the graphical objects 254a, 254b displayed on the screen. The control means 460 is configured to receive an indication from the user on how to further adjust the threshold time.

In one embodiment the mobile terminal 200 is capable of finding and adjusting the optimum time threshold $T_{opt}$ for each graphical object 254a, 254b that is being shown on the touch display. The mobile terminal determines at least one property of the graphical object 254a, 254b that is being touched. The property of the graphical object may be any of the described features, such as color(s), shape, size, distance between adjacent objects, a function that the graphical object represents and/or a relative location in the touch area of the touch display. After the determination of the graphical object 254a, 254b the mobile terminal determines the optimum time threshold $T_{opt}$ corresponding to the graphical object 254a, 254b. The determination of the optimum time threshold $T_{opt}$ is based on at least one property of the graphical object and/or based on a user behavior pattern.

The property/properties of a graphical object 254a, 254b may be classified as either a high priority property or a low priority property. High priority properties may be small objects, objects with colors that are hard to detect, objects being of an irregular shape and/or objects that are located very close to one another. Low priority properties may be big objects, objects with bright colors that are easy to detect, objects of regular shapes that are easy to touch and/or objects located far away from each other. If an object has many properties (e.g. high priority object that is small and irregular in shape) that makes it hard for the user to correctly touch the object, the time threshold will be set to a higher value than if the object only has one property that may make it harder to correctly touch (e.g. small object).

Figure 10:
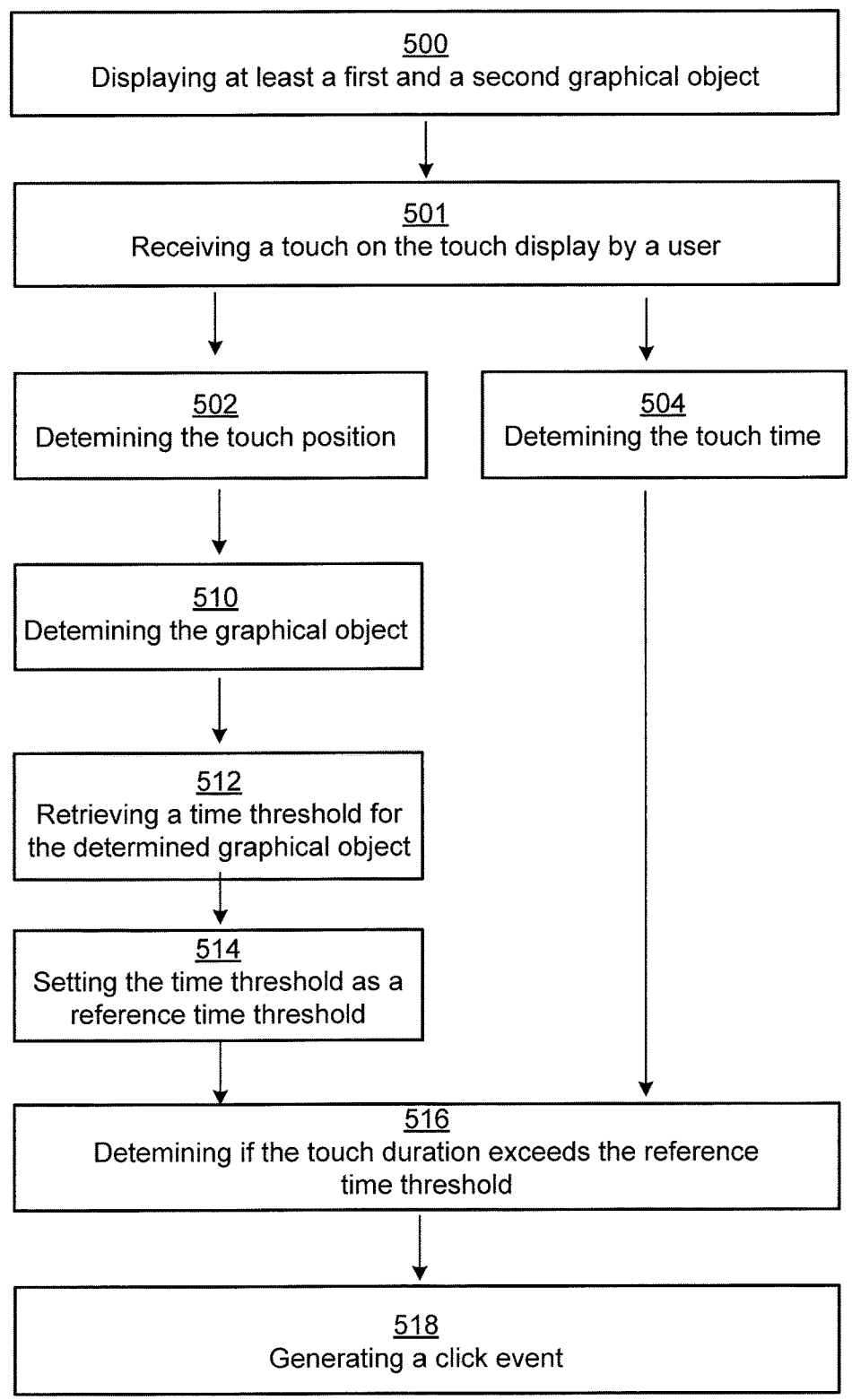
FIG. 10 is a flowchart of a method of adjusting the time threshold of a click event according to one embodiment.

FIG. 10 shows a flowchart of a method of adjusting the sensitivity of a click event using a mobile communication terminal comprising a controller and a touch display according to one embodiment. The method involves displaying, 500, at least a first graphical object 254a and a second graphical object 254b on the touch display. The first graphical object 254a is associated with a first time threshold $T_1$, and the second graphical object 254b is associated with a second time threshold $T_2$.

The first time threshold $T_1$ is either higher or lower than the second time threshold $T_2$ depending on one or more of the following:
 a size, shape or/and color of the respective graphical object 254a, 254b,
 a distance from the respective graphical object 254a to a neighboring graphical object 254b,
 a relative location of the respective graphical object 254a, 254b in a touch area of the touch display 430, and
 a level of the respective graphical object 854a, 854b/c, 854d/e in a menu hierarchy.

The touch display is receiving, 501, a touch from a user 1 and is determining, 502, 504, a touch position 256 and a touch duration 257 for the touch. The controller is then receiving, 506, 508, the touch position 256 and the touch duration 257 from the touch display. The controller is also determining, 510, a graphical object 254a, 254b corresponding to the touch position 256. The controller is further retrieving the time threshold $T_1$, $T_2$ corresponding to the determined graphical object 254a, 254b.

In one embodiment, the controller retrieves, 512, the time threshold $T_1$, $T_2$ from a list in the memory.

In another embodiment, the controller retrieves the time threshold $T_1$, $T_2$ as a property of the corresponding graphical object 254a, 254b, or of a data object defined in an object-oriented programming language to represent the graphical object 254a, 254b.

The method further involves setting, 514, the time threshold $T_1$, $T_2$ as the reference threshold $T_{ref}$ and determining, 516, if the touch duration 257 exceeds the reference time threshold $T_{ref}$. If the touch duration 257 exceeds the reference time threshold $T_{ref}$, the controller is generating, 518, a click event 260 for the corresponding graphical object 254a, 254b. If the touch duration 257 does not exceed the reference time threshold $T_{ref}$, no click on the touch display is registered.

The invention has been described above in detail with reference to embodiments thereof. However, as is readily understood by those skilled in the art, other embodiments are equally possible within the scope of the present invention, as defined by the appended claims.

Alternative inventive aspects are defined in the following numbered clauses.

I. A mobile communication terminal comprising a controller and a touch display, said touch display being arranged to:

display at least a first graphical object and a second graphical object;

receive a touch, and determine a touch position and a touch duration for said touch, wherein said controller is configured to:

receive said touch position and said touch duration;

determine a graphical object, among said first graphical object and said second graphical object, corresponding to said touch position;

determine if said touch duration exceeds a reference time threshold; and if so, generate a click event for said corresponding graphical object, said mobile communication terminal being characterized in that said first graphical object is associated with a first time threshold and said second graphical object is associated with a second time threshold, said first time threshold being different from said second time threshold, and in that said controller is further configured to:

retrieve said first time threshold if said corresponding graphical object is said first graphical object and use said first time threshold as said reference time threshold; and retrieve said second time threshold if said corresponding graphical object is said second graphical object and use said second time threshold as said reference time threshold.

II. The mobile communication terminal according to clause I, wherein the controller is configured to retrieve the first time threshold or the second time threshold from a list stored in a memory of the mobile communication terminal.

III. The mobile communication terminal according to clause I, wherein the controller is configured to retrieve the first or second time threshold as a property of the corresponding graphical object, or of a data object defined in an object-oriented programming language to represent the graphical object.

IV. The mobile communication terminal according to any of clauses I-III, wherein said first time threshold is either higher or lower than said second time threshold, depending on a priority of a function that the corresponding graphical object represents.

V. The mobile communication terminal according to clause IV, wherein the priority of the function reflects a severity of possible consequences occurring if a user would unintentionally generate a click event.

VI. The mobile communication terminal according to any of clauses I-III, wherein said first time threshold is either higher or lower than said second time threshold, depending on a size, shape or/and color of the corresponding graphical object.

VII. The mobile communication terminal according to any of clauses I-III, wherein said first time threshold is either higher or lower than said second time threshold, depending on a distance to a neighboring graphical object.

VIII. The mobile communication terminal according to any of clauses I-III, wherein said first time threshold is either higher or lower than said second time threshold, depending on a relative location of the graphical object in a touch area of the touch display.

IX. The mobile communication terminal according to any of clauses I-VIII, wherein said graphical object is selected from: a virtual key, a virtual object, a menu item and a function.

X. The mobile communication terminal according to any of the preceding clauses, wherein said controller is further arranged to:

after having determined the corresponding graphical object, determine at least one property of said graphical object;

determine an optimum time threshold for said graphical object based on said property of said graphical object;

determine if said touch duration exceeds said optimum time threshold for said graphical object; and if so, generate a click event for said corresponding graphical object.

XI. The mobile communication terminal according to clause X, wherein determining an optimum time threshold is based on at least one property of the graphical object and/or based on a user behavior pattern.

XII. The mobile communication terminal according to any of clauses X-XI, wherein the property comprises at least one of color(s), shape, size, distance between adjacent objects, a function that the graphical object represents, and/or a relative location in a touch area of the touch display.

XIII. The mobile communication terminal according to any of clauses I-XII, wherein the mobile communication terminal is a smartphone.

XIV. A method of providing adaptive sensitivity of a click event for a mobile communication terminal having a touch display, the method comprising:

displaying at least a first graphical object and a second graphical object on the touch display;

associating said first graphical object with a first time threshold;

associating said second graphical object with a second time threshold;

receiving a touch on the touch display from a user;

determining a touch position and a touch duration for said touch;

determining a graphical object corresponding to said touch position;

retrieving a time threshold, among said first time threshold and said second time threshold, corresponding to the determined graphical object;

setting said time threshold as a reference threshold;

determining if said touch duration exceeds said reference time threshold; and if so, generating a click event for said corresponding graphical object.

XV. The method according to clause XIV, wherein the method is for adjusting the sensitivity of a click event either for a high or a low priority function associated with a graphical object, while keeping the time threshold for the other graphical objects the same.

The invention claimed is:

1. A mobile communication terminal comprising a controller and a touch display, said touch display being arranged to:

display at least a first graphical object and a second graphical object;

receive a touch, and determine a touch position and a touch duration for said touch, wherein said controller is configured to:

receive said touch position and said touch duration;

determine a graphical object, among said first graphical object and said second graphical object, corresponding to said touch position;

determine if said touch duration exceeds a reference time threshold; and if so, generate a click event for said corresponding graphical object, wherein said first graphical object is associated with a first time threshold and said second graphical object is associated with a second time threshold, said first time threshold being different from said second time threshold, wherein said controller is further configured to:

retrieve said first time threshold if said corresponding graphical object is said first graphical object and use said first time threshold as said reference time threshold; and retrieve said second time threshold if said corresponding graphical object is said second graphical object and use said second time threshold as said reference time threshold, and wherein said first time threshold is either higher or lower than said second time threshold depending on one or more of the following:

(i) a size, shape, or color of the corresponding graphical object, (ii) a distance from the corresponding graphical object to a neighboring graphical object, and (iii) a relative location of the corresponding graphical object in a touch area of the touch display.

2. The mobile communication terminal according to claim 1, wherein the controller is configured to retrieve the first time threshold or the second time threshold from a list stored in a memory of the mobile communication terminal.

3. The mobile communication terminal according to claim 1, wherein the controller is configured to retrieve the first or second time threshold as a property of the corresponding graphical object, or of a data object defined in an object-oriented programming language to represent the graphical object.

4. The mobile communication terminal according to claim 1, wherein said graphical object is one of:

a button, and a menu item.

5. The mobile communication terminal according to claim 1, wherein said controller is further arranged to:

after having determined the corresponding graphical object, determine at least one property of said graphical object;

determine an optimum time threshold for said graphical object based on said at least one property of said graphical object, a user behavior pattern, or both said at least one property of said graphical object and said user behavior pattern;

determine if said touch duration exceeds said optimum time threshold for said graphical object; and if so, generate a click event for said corresponding graphical object.

6. The mobile communication terminal according to claim 5, wherein said at least one property of said graphical object comprises at least one of color(s), shape, size, distance between adjacent objects, a function that the graphical object represents, or a relative location in a touch area of the touch display.

7. The mobile communication terminal according to claim 1, wherein the mobile communication terminal is a smartphone.

8. A method of providing adaptive sensitivity of a click event for a mobile communication terminal having a touch display, the method comprising:

displaying at least a first graphical object and a second graphical object on the touch display;

associating said first graphical object with a first time threshold;

associating said second graphical object with a second time threshold;

receiving a touch on the touch display from a user;

determining a touch position and a touch duration for said touch;

determining a graphical object corresponding to said touch position;

retrieving a time threshold, among said first time threshold and said second time threshold, for the determined graphical object;

setting said time threshold as a reference threshold;

determining if said touch duration exceeds said reference time threshold; and if so, generating a click event for said corresponding graphical object, wherein said first time threshold is either higher or lower than said second time threshold depending on one or more of the following:

(i) a size, shape, or color of the corresponding graphical object, (ii) a distance from the corresponding graphical object to a neighboring graphical object, (iii) a relative location of the corresponding graphical object in a touch area of the touch display.

9. The method according to claim 8, wherein said retrieving of a time threshold, among said first time threshold and said second time threshold, involves retrieving the time threshold from a list stored in a memory of the mobile communication terminal.

10. The method according to claim 8, wherein said retrieving of a time threshold, among said first time threshold and said second time threshold, involves retrieving the time threshold as a property of the corresponding graphical object, or of a data object defined in an object-oriented programming language to represent the graphical object.

11. The method according to claim 8, wherein said graphical object is one of:
 a button, and
 a menu item.

\* \* \* \* \*